1-27-76 OR 3,935,418

United States Patent [19]

Stand et al.

[11] 3,935,418

[45] Jan. 27, 1976

[54] PLASMA GUN INCLUDING EXTERNAL ADJUSTABLE POWDER FEED CONDUIT AND INFRARED RADIATION REFLECTOR

[75] Inventors: Mille Stand, New York; Stephen U. Davis, New Rochelle, both of N.Y.

[73] Assignee: Sealectro Corporation, Mamaroneck, N.Y.

[22] Filed: Apr. 17, 1974

[21] Appl. No.: 461,482

[52] U.S. Cl. .............................. 219/121 P; 219/76
[51] Int. Cl.[2] .............................. B23K 5/00
[58] Field of Search ............. 219/121 P, 76, 74, 75, 219/137, 85 B, 85 BM, 349; 117/47 H, 93.1 PF; 313/231.3

[56] References Cited

UNITED STATES PATENTS

| | | | |
|---|---|---|---|
| 2,698,812 | 1/1955 | Schladitz | 219/76 X |
| 2,861,166 | 11/1958 | Cangill, Jr. | 219/68 |
| 3,015,013 | 12/1961 | Laszlo | 219/349 X |
| 3,179,783 | 4/1965 | Johnson | 219/76 |
| 3,179,784 | 4/1965 | Johnson | 219/76 |
| 3,347,698 | 10/1967 | Ingham, Jr. | 117/47 |
| 3,374,531 | 3/1968 | Bruce | 219/85 BM |
| 3,573,090 | 3/1971 | Peterson | 117/93.1 |
| 3,648,015 | 3/1972 | Fairbairn | 219/121 P |
| 3,830,999 | 8/1974 | Yoshizumi et al. | 219/137 |

*Primary Examiner*—Elliot A. Goldberg
*Assistant Examiner*—G. R. Peterson
*Attorney, Agent, or Firm*—Anthony J. Casella

[57] ABSTRACT

A plasma spray gun having an arc space within the gun housing for heating and ionizing an inert gas propelled therethrough includes an external, adjustable powder feed conduit so that the powder may be applied to the flame of the gun after it has left the gun nozzle. The plasma gun also utilizes a concave reflector attached to the gun to reflect the infrared radiation and direct it to a limited area on the substrate where most of radiant heat is absorbed.

11 Claims, 5 Drawing Figures

PLASMA GUN INCLUDING EXTERNAL ADJUSTABLE POWDER FEED CONDUIT AND INFRARED RADIATION REFLECTOR

CROSS REFERENCES TO RELATED PATENTS

This invention is related to U.S. Pat. No. 3,627,204, issued Dec. 14, 1971, and to U.S. Pat. No. 3,676,638 issued July 11, 1972, of which this invention is, in part, an improvement, and which patents are incorporated herein by reference. Both of the above identified patents and this application are assigned to the same assignee.

BACKGROUND OF INVENTION

Plasma spray guns have played an important part in many spray coating operations and have aided in coating substrates with Teflon, powdered paint, and some metals. Plasma spraying has been useful because the coatings have been more uniform, easier to apply, and easier to control. Experience with coatings of various types has indicated that, if the spray technique is to be applied to many other powdered materials, increased substrate temperatures and increased coating thicknesses must be made possible. This is particularly important when the spray methods are used in mass production applications.

Some materials, such as epoxies, which have a low melting point viscosity, flow out quickly to form a liquid film and permit a fast cooling rate. Other materials, such as Ultra-High Density Polyethylene, have a high melting point viscosity and require a slower coating rate in order to assure a proper film formation.

The area covered by a moving plasma spray gun depends upon the dimensions of the spray cone and the distance it is held from the work piece. The lower the melting point of the powder deposited, the farther the gun may be held from the work piece, resulting in a larger cross-section of the spray cone on the substrate surface. On the other hand, the higher the melting point of the powder deposited, the closer the gun must be held to the work piece.

It is well known that the high temperature existing in the plasma flame is due to the ionization caused by the electrical arc inside the gun housing and the subsequent recombination of the electrons and ions in the flame itself. This ionization produces a large amount of infrared radiation, in addition to the thermal energy resulting from the motion of the ions and electrons interacting with the streaming gas. If nitrogen is used at the degree of ionization typical of the operation of plasma guns as described in U.S. Pat. Nos. 3,676,638 and 3,627,204, most of the radiant energy generated is in the infrared region.

With respect to said patents, it has been found that the rate of deposition and the quality of the coating of various plastics and other dry powder coating materials on metallic and other substrates can be markedly improved by the use of a reflector, and also by placing the powder feed tube or tubes externally of the spray gun and supported by the spray gun so that the angle of entry of the powder onto the plasma jet can be varied, depending on which material is being sprayed. As referred to hereinabove, the improved quality of the coatings relates to uniformity of coating thickness, ease of control of obtaining a specified coating thickness, and increased speed of applying such coating to a given thickness requirement. All of these quality improvements are necessary and desirable if the plasma gun is to achieve its maximum utility, particularly in mass production spray coating applications.

Accordingly, it is the primary object of the present invention to provide a new and improved plasma spray gun which includes an adjustable powder feed conduit mounted externally of the gun so that powder may be applied to the flame after it has left the gun nozzle. The invention also provides a curved reflector attached to the gun for reflecting and focussing the infrared radiation and directing it to a limited area on the substrate where most of the radiation is absorbed and transformed into heat.

Another object of the present invention is the provision of the use of adjustable powder feed tubes for applying powder to the plasma flame to insure that the powder particles will be melted but not vaporized when they are applied to the substrate work piece.

Still another feature of the invention is the use of a curved concave reflector surrounding the plasma flame after it reaches the space between the nozzle and the substrate work piece. The reflector increases the temperature of the surface of the work piece and produces a more even coating.

SUMMARY OF THE INVENTION

The invention comprises a plasma spray gun which ejects a plasma flame from a nozzle to deposit powdered material onto a substrate work piece. A reflector is mounted on the gun adjacent to the nozzle for reflecting the infrared rays generated in the plasma flame and focussing said rays on the substrate work piece. The reflector may have a concave reflecting area for collecting and converging the rays toward a limited area on the substrate work piece where the infrared heat rays are absorbed. One or more adjustable conduits are provided for providing powder to the plasma flame at a desired position between the nozzle and the substrate.

Additional details of the invention will be disclosed in the following description, taken in conjunction with the accompanying drawings.

DESCRIPTION OF THE PREFERRED EMBODIMENTS

Figure 1:
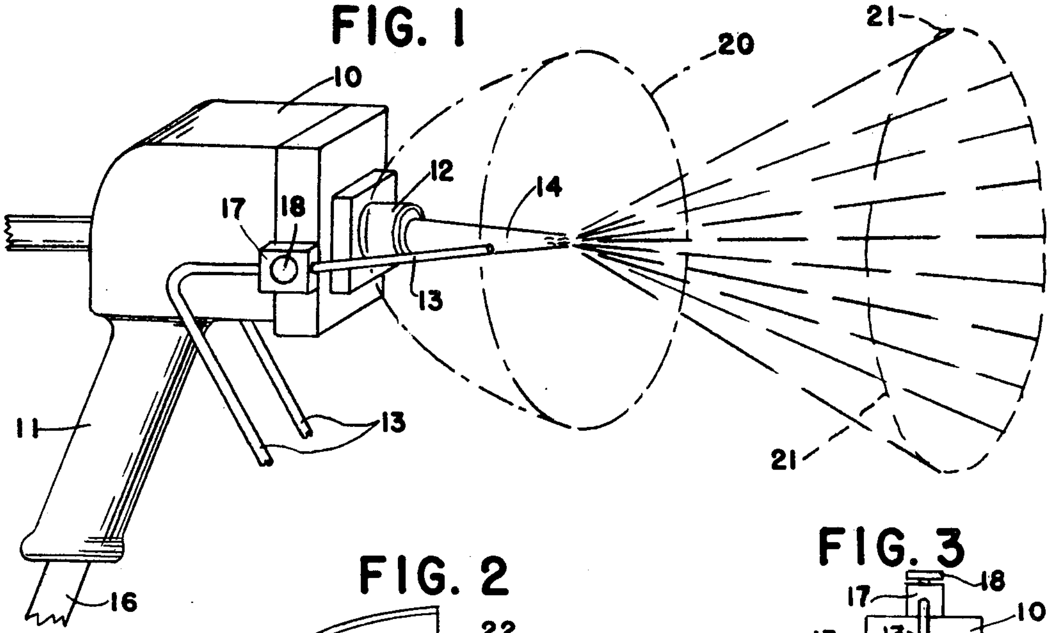
FIG. 1 is a perspective view of the subject invention showing the adjustable powder tubes, the position of an ellipsoidal reflector, and the general spreading pattern of the melted particles.
Figure 4:
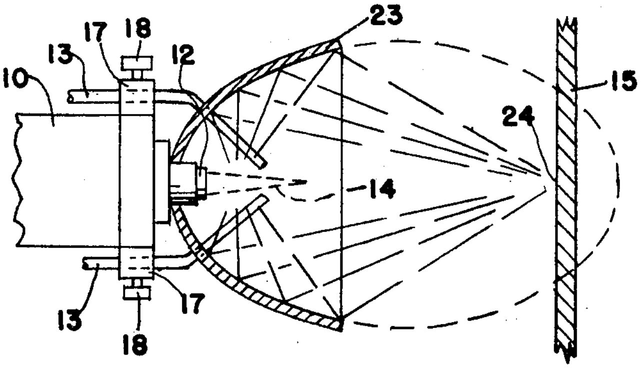
FIG. 4 is a cross sectional view of an ellipsoidal reflector, the plasma flame, and a substrate.

Turning to FIGS. 1 and 4, the plasma spray gun of the subject invention includes a housing 10 to which is attached a handle 11 and a nozzle 12, with two powder conveying conduits 13 being provided to apply powder to the flame 14 for delivery to substrate 15. As illustrated in the figures, the powder conveying conduits 13 are disposed externally of the housing 10. An electric arc inside the housing ionizes the gas molecules and creates the flame 14. Details of the construction of the housing 10 and the arc are shown in the U.S. Pat. No. 3,676,638, referred to above. However, in the present case there are no internal powder tubes and thus the nozzle may be considerably shorter. Electrical lead 16 connects the arc within the gun to a source of electrical power (not shown) at a convenient external location.

Conduits 13 convey the powder to the flame, and are adjustably secured to blocks 17 fastened to the side of the housing 10. Manually operable clamping screws 18 are provided for holding the conduits 13 in place. The mounting of tubes 13 insures that the tubes may be adjustable along the axial length of the flame 14, as well as being angularly adjustable relative to the flame. As noted above, the area of substrate 15 that is covered with each pass of the plasma spray gun depends on the area of the spray cone, and also on the distance of the spray gun from the substrate. The lower the melting point of the powder, the farther the gun may be held from the substrate resulting in a larger cross section of the spray cone on the surface of the substrate. The same effect can be accomplished by changing of the angle of the powder feed tubes 13 with respect to the plasma flame 14, and the point at which the powder reaches the plasma, i.e. the distance from where the plasma flame 14 emerges from the nozzle. As noted above the mounting of the powder tubes 13 enables the tubes to be adjusted relative to the plasma flame so as to obtain optimum spray conditions.

FIG. 1 shows in dashed lines the general placement of an infrared reflector 20 which collects the infrared radiation generated by the plasma gun, and applies it to the substrate 15. After leaving the flame 14, the powdered particles spread out to cover a circular area 21, but the angular deviation of circular area 21 can be varied considerably by adjusting the gas pressure, the arc current, and the shape of the nozzle.

By means of the reflector 20, the infrared radiation generated by the plasma flame 14 can be focussed on to the object to be coated. Thus by utilizing the total available energy more efficiently, a number of benefits can be obtained, such as, a reduction in electrical power requirement, and a faster coating rate, in addition to a better quality coating. It is also noted that as a result of the lower power of the plasma jet and less residence time of the dry powder coating particles crossing the plasma flame 14, thermal degradation is reduced to practically zero, thereby achieving a better and stronger coating film with no discoloration.

Figure 2:
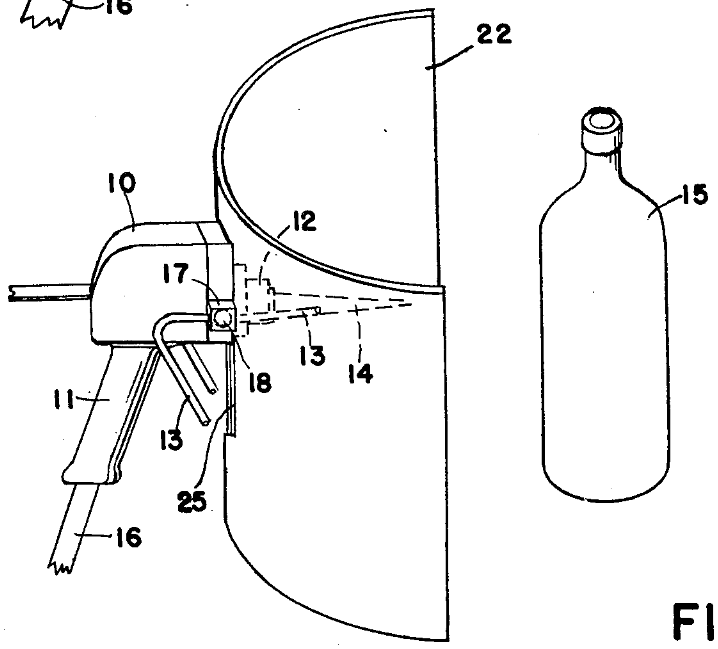
FIG. 2 is a perspective view of the plasma gun of the subject invention including a cylindrical reflector directed at a substrate in the form of a bottle.

Typically, the reflector may have an elliptical configuration, and may be either attached to the plasma gun or in a fixed position enabling the gun to move inside the reflector. Referring to FIG. 2, a generally cylindrical reflector 22 is secured to the housing 10 for directing the infrared radiation toward a cylindrical work piece 15, in this case a glass bottle. It is noted that the longitudinal axis of the work piece 15 is aligned with the longitudinal axis of the reflector in order to achieve maximum coating of the bottle with each pass of the plasma gun. As shown in FIG. 2, the cylindrical reflector 22 includes an axially extended slot 25 in which the plasma gun is movably mounted. By this arrangement, the gun may be moved in a generally vertical direction so as to vary the vertical displacement of the spray cone, if necessary. It is noted that a coating of Polyethelene on the bottle 15 can reduce damage, when the bottle is broken, by restraining the shattered pieces and holding all fragments in a restricted space.

Figure 3:
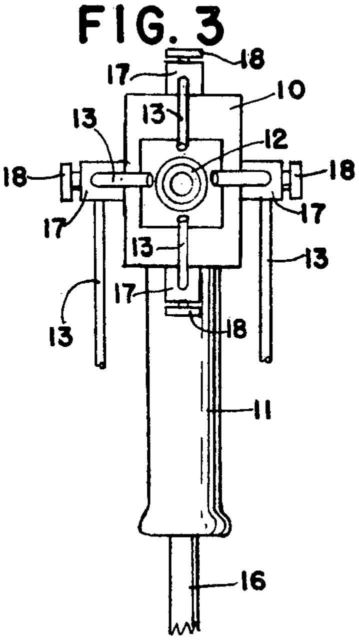
FIG. 3 is a front view of the plasma gun without the reflector, showing four powder conveying conduits.

Referring to FIG. 3, the plasma spray gun may be provided with four adjustable powder conveying conduits 13, each adapted to provide powder to the plasma flame 14. It has been found that, for certain applications, the heat content of the plasma is greater than the amount required to melt and fuse the quantity of powder coming out of only two feed tubes, using, therefore, more than two powder conveying conduits 13, will increase the coating rate thereby making the gun more productive and utilizing the available energy even more efficiently. Of course, where required, more than four powder conveying conduits may be provided.

FIG. 4 shows the elliptical reflector 23 secured to the housing 10 with its inner reflecting surface receiving the infrared rays from the flame 14 on one focal space and focussing the rays onto a limited area 24 on substrate 15. It should be noted that the reflector of the subject invention, in addition to providing the beneficial effects of reflecting the infrared radiation, protects the operator and shields his hands from radiation which, of course, could produce burns.

Figure 5:
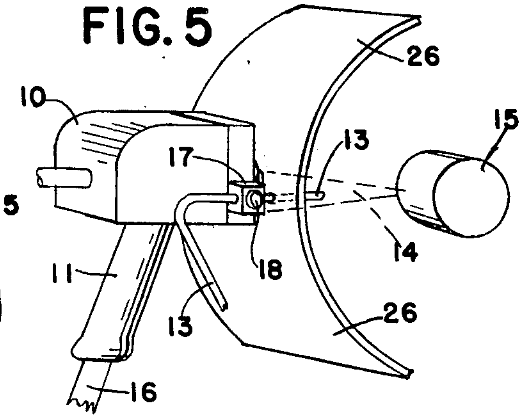
FIG. 5 is a perspective view of another embodiment of the subject invention.

FIG. 5 illustrates another embodiment of the subject invention in which an elliptical reflector 26 is secured to the plasma gun housing 10, with its longitudinal axis being disposed transversely so as to be generally aligned with an elongated substrate 15. If desired, a longitudinal slot may be provided in reflector 26 in order to enable the plasma gun to be movable in a transverse direction.

Although the reflector has been illustrated as comprising an elliptical configuration, and being either attached to the plasma gun or in a fixed position so as to enable the gun to be moved inside the reflector, it is obvious that depending on the coating material to be used and the objects to be coated, the reflector surface may be of a parabolic, or other similarly curved surfaces so as to achieve the desired reflection of the infrared rays. Furthermore, depending on the spray cone, and the distance of the work piece from the spray gun, the curvature of the reflector may be varied to insure that the reflected radiation alights approximately upon the substrate to be coated.

Accordingly there is provided a new and improved plasma spray gun provided with one or more external powder feed tubes that may be adjusted relative to the plasma flame in order to achieve optimum spray conditions. Furthermore, by means of an appropriate reflector, the infrared radiation generated concomitant with the thermal energy resulting from the plasma flame may be focussed onto the object to be coated thereby utilizing the total available energy more efficiently so as to achieve a reduction of the electrical power requirement for the gun, and a faster coating rate, in addition to a better quality coating.

While there has been described and illustrated several embodiments of the invention, it would be obvious that various changes and modifications can be made therein without departing from the spirit of the invention which should be limited only by the scope of the appended claims.

The embodiments of the invention, in which an exclusive property or privelege is claimed, are defined as follows:

1. In a plasma gun having a flame ejected from a nozzle for depositing powdered material onto a substrate located at a distance spaced from the end of said flame, said flame comprised of three thermal components, namely, conductive, convective and radiative, with said conductive and convective components being carried forward with the streaming plasma gas, the improvement comprising:

at least one adjustable powder conveying conduit for applying powdered fluent material to the plasma flame, said conduit secured to said gun; and a reflector mounted on said gun for utilizing the radiative thermal component, said reflector having a concave reflecting area, said plasma flame disposed at the focal point of the reflector so that the reflector focusses the radiative thermal component toward the substrate for assisting in the melting of the powdered material and increasing the temperature of said substrate to facilitate the deposition of the powdered material.

2. A plasma gun according to claim 1 wherein said reflector has an elliptical cross section.

3. A plasma gun according to claim 1 wherein said reflector is a portion of a cylinder.

4. A plasma gun according to claim 1 in which said reflector includes an elongated slot, and wherein said plasma gun is slidably mounted in said elongated slot of the reflector.

5. A plasma gun according to claim 1 wherein said reflector has a parabolic cross section.

6. A plasma gun according to claim 1 wherein the configuration of said reflector is a truncated ellipsoid.

7. A plasma gun according to claim 1 wherein said adjustable powder conveying conduit is fastened to the gun by a manually operated clamp.

8. A plasma gun according to claim 1 wherein two of said adjustable powder conveying conduits are provided for applying powdered fluent material to the plasma flame, said conduits being mounted on opposite sides of the nozzle.

9. A plasma gun according to claim 1 wherein said conduit is adjustable for delivery of powder to the varying positions along the length of the flame.

10. A plasma gun according to claim 1 wherein a plurality of adjustable powder conveying conduits are secured to the gun.

11. In a plasma gun having a flame and infrared heat rays ejected from a nozzle for depositing powdered material onto a substrate located at a distance spaced from the end of the flame, the improvement comprising:

a plurality of powder conveying conduits for applying powdered fluent material to the plasma flame, each of said conduits being adjustably mounted on the plasma gun; and a reflector mounted on said gun and having a concave reflecting area, said plasma flame disposed at the focal point of the reflector so that the latter focuses the infrared heat rays onto the substrate thereby increasing the temperature thereof to facilitate the deposition of the powdered material, said reflector including an elongated slot along which said plasma gun is slidably mounted.

* * * * *